United States Patent
Soda et al.

(10) Patent No.: US 11,072,144 B2
(45) Date of Patent: Jul. 27, 2021

(54) LAMINATE

(71) Applicant: DAIKIN INDUSTRIES, LTD., Osaka (JP)

(72) Inventors: Yoshihiro Soda, Settsu (JP); Hiromichi Momose, Settsu (JP); Manabu Asai, Settsu (JP); Takuya Kinoshita, Shanghai (CN)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 15/038,797

(22) PCT Filed: Nov. 26, 2014

(86) PCT No.: PCT/JP2014/081245
§ 371 (c)(1),
(2) Date: May 24, 2016

(87) PCT Pub. No.: WO2015/080152
PCT Pub. Date: Jun. 4, 2015

(65) Prior Publication Data
US 2017/0157891 A1 Jun. 8, 2017

(30) Foreign Application Priority Data
Nov. 26, 2013 (JP) .............................. JP2013-244024

(51) Int. Cl.
B32B 5/16 (2006.01)
B32B 27/06 (2006.01)
B05D 5/08 (2006.01)
B05D 7/00 (2006.01)
C09D 127/18 (2006.01)

(52) U.S. Cl.
CPC ................ *B32B 5/16* (2013.01); *B05D 5/083* (2013.01); *B05D 7/58* (2013.01); *B32B 27/06* (2013.01); *C09D 127/18* (2013.01); *B32B 2307/306* (2013.01); *B32B 2307/538* (2013.01)

(58) Field of Classification Search
None
See application file for complete search history.

(56) References Cited

U.S. PATENT DOCUMENTS 5,106,682 A * 4/1992 Matsushita ............ B05D 5/068
428/324
6,291,054 B1 9/2001 Thomas et al.

| | | | |
|---|---|---|---|
| 2004/0110011 A1 | 6/2004 | Shah et al. | |
| 2006/0134404 A1* | 6/2006 | Witsch ................. | A47J 36/02 428/331 |
| 2007/0054129 A1* | 3/2007 | Kalkanoglu .......... | B32B 27/304 428/413 |
| 2007/0134488 A1 | 6/2007 | Hayakawa | |
| 2007/0231563 A1 | 10/2007 | Adams et al. | |
| 2008/0017241 A1* | 1/2008 | Anderson ......... | B32B 17/10853 136/251 |
| 2009/0072185 A1* | 3/2009 | Raksha ................. | B82Y 30/00 252/62.51 R |
| 2012/0034448 A1 | 2/2012 | Liu | |
| 2013/0240021 A1* | 9/2013 | Mu ........................ | B32B 27/34 136/251 |

FOREIGN PATENT DOCUMENTS

| | | | | |
|---|---|---|---|---|
| CN | 101415763 A | 4/2009 | | |
| JP | 2000-238205 A | 9/2000 | | |
| JP | 2009-504386 A | 2/2009 | | |
| JP | 4853081 B | 1/2012 | | |
| JP | 2013-538706 A | 10/2013 | | |
| JP | 2014-133815 A | * | 7/2014 | ............ C09J 175/04 |
| WO | 2007/021800 A1 | 2/2007 | | |
| WO | 2007/114941 A2 | 10/2007 | | |
| WO | 2012/019088 A1 | 2/2012 | | |

OTHER PUBLICATIONS

Communication dated May 30, 2017, from the European Patent Office in counterpart European Application No. 14865030.2.
International Search Report for PCT/JP2014/081245 dated Feb. 17, 2015 [PCT/ISA/210].
English translation of International Preliminary Report on Patentability dated May 31, 2016 from the International Bureau in application No. PCT/JP2014/081245.

* cited by examiner

*Primary Examiner* — Frank J Vineis
*Assistant Examiner* — Nicole T Gugliotta
(74) *Attorney, Agent, or Firm* — Sughrue Mion, PLLC

(57) ABSTRACT

The present invention provides a laminate excellent in abrasion resistance, high in hardness, and excellent in adhesion between a substrate and a primer layer and adhesion between an intermediate layer and a top coat layer. The laminate includes: a substrate; a primer layer disposed on the substrate, the primer layer containing inorganic particles (a1) having an average particle size of 3 μm or greater and a heat-resistant resin (a2), but not containing a fluororesin; an intermediate layer disposed on the primer layer and containing a fluororesin (b1) and a heat-resistant resin (b2); and a top coat layer disposed on the intermediate layer and containing a fluororesin (c1).

9 Claims, No Drawings

LAMINATE

CROSS REFERENCE TO RELATED APPLICATIONS

This application is a National Stage of International Application No. PCT/JP2014/081245 filed Nov. 26, 2014, claiming priority based on Japanese Patent Application No. 2013-244024 filed Nov. 26, 2013, the contents of all of which are incorporated herein by reference in their entirety.

TECHNICAL FIELD

The present invention relates to laminates.

BACKGROUND ART

Fluororesins such as polytetrafluoroethylene, tetrafluoroethylene/perfluoro(alkyl vinyl ether) copolymers, and tetrafluoroethylene/hexafluoropropylene copolymers have low coefficients of friction, and are excellent in properties such as non-adhesiveness, chemical resistance, and heat resistance. Thus, they are widely used for surface treatment on articles such as supplies for the food industry, kitchen utensils (e.g., frying pans and pots), household utensils (e.g., irons), supplies for the electric industry, and supplies for the machine industry.

In contrast, the fluororesins are poor in adhesiveness to substrates due to the non-adhesiveness of the fluororesins. In order to improve such adhesiveness, a laminate of a fluororesin layer and a primer layer is proposed; the primer layer is obtained by preliminarily applying, as an undercoat, a primer that is a blend of a binder resin (e.g., heat-resistant engineering plastic) and a fluororesin to a substrate.

In order to improve the abrasion resistance and strength of such a laminate, addition of filler in formation of the layers has been proposed recently. Even if filler is added in an amount sufficient for the above purposes, however, the improvement in the abrasion resistance and strength has its limit because the fluororesins are essentially soft and the filler easily falls.

Patent Literature 1 discloses a technique of improving the interlayer adhesion by blending a water-soluble, curable polyamide-imide and/or polyimide binder polymer, spherical ceramic particles, and modified polytetrafluoroethylene having a melt creep viscosity at 380° C. of $8 \times 10^9$ or higher and $1.0 \times 10^{10}$ Pa·s or lower and having a standard specific gravity of 2.146 or higher and 2.170 or lower into a primer layer and a top coat layer on a substrate.

Patent Literature 2 discloses a non-adhesive film including, on a substrate, an undercoat and an overcoat each containing a fluoropolymer resin, the undercoat further containing ceramic particles projecting from the undercoat. Thereby, this patent literature aims to avert the wearing force applied to the film surface and to improve the abrasion resistance and the durability.

Patent Literature 3 discloses a method of providing, on a base coat, a non-sticky coating formed of a primer, an intermediate layer, and a top coat each containing a fluoropolymer resin, the base coat being formed on a substrate and containing a heat-resistant non-fluoropolymer binder and inorganic filler particles having an average particle size of about two micrometers. Thereby, this patent literature aims to improve the adhesiveness to the substrate.

CITATION LIST

Patent Literature

Patent Literature 1: JP 4853081 B
Patent Literature 2: JP 2000-238205 A
Patent Literature 3: JP 2009-504386 T

SUMMARY OF INVENTION

Technical Problem

The present invention aims to provide a laminate excellent in abrasion resistance, high in hardness, and excellent in adhesion between a substrate and a primer layer and in adhesion between an intermediate layer and a top coat layer.

Solution to Problem

The inventors found that a laminate including a substrate, a primer layer disposed on the substrate, an intermediate layer disposed on the primer layer, and a top coat layer disposed on the intermediate layer can achieve excellent abrasion resistance, high hardness, and excellent adhesion between the substrate and the primer layer and excellent adhesion between the intermediate layer and the top coat layer when the primer layer contains a heat-resistant resin and inorganic particles having a specific average particle size, the intermediate layer contains a fluororesin and a heat-resistant resin, and the top coat layer contains a fluororesin.

Specifically, the present invention relates to a laminate including: a substrate; a primer layer disposed on the substrate, the primer layer containing inorganic particles (a1) having an average particle size of 3 μm or greater and a heat-resistant resin (a), but not containing a fluororesin; an intermediate layer disposed on the primer layer and containing a fluororesin (b1) and a heat-resistant resin (b2); and a top coat layer disposed on the intermediate layer and containing a fluororesin (c1).

The inorganic particles (a1) are preferably ceramic particles.

The inorganic particles (a1) are preferably particles of at least one selected from the group consisting of inorganic nitrides, carbides, borides, and oxides.

The inorganic particles (a1) preferably have a Knoop hardness of 1200 or higher.

The heat-resistant resin (a2) is preferably at least one selected from the group consisting of polyamide-imides, polyimides, and polyethersulfones.

The fluororesin (c1) preferably contains polytetrafluoroethylene.

The primer layer is preferably obtained by applying a water paint containing the inorganic particles (a1) and the heat-resistant resin (a2) to the substrate.

The primer layer preferably has a thickness of 10 to 30 μm.

The top coat layer preferably contains inorganic particles (c2).

The inorganic particles (c2) are preferably particles of at least one selected from the group consisting of inorganic nitrides, carbides, borides, and oxides.

The intermediate layer is preferably free from inorganic particles.

The fluororesin (b1) preferably contains polytetrafluoroethylene.

The heat-resistant resin (b2) is preferably at least one selected from the group consisting of polyamide-imides, polyimides, and polyethersulfones.

The primer layer preferably has a maximum height roughness (Rz) of 10 μm or higher.

The present invention will be described in detail below.

The present invention relates to a laminate including: a substrate; a primer layer disposed on the substrate, the primer layer containing inorganic particles (a1) having an average particle size of 3 μm or greater and a heat-resistant resin (a2), but not containing a fluororesin; an intermediate layer disposed on the primer layer and containing a fluororesin (b1) and a heat-resistant resin (b2); and a top coat layer disposed on the intermediate layer and containing a fluororesin (c1). The laminate of the present invention includes the substrate, the primer layer, the intermediate layer, and the top coat layer stacked in the given order. The substrate and the primer layer, the primer layer and the intermediate layer, and the intermediate layer and the top coat layer directly adhere to each other.

The primer layer constituting the laminate of the present invention contains inorganic particles (a1) having an average particle size of 3 μm or greater and a heat-resistant resin (a2), but does not contain a fluororesin.

Since the primer layer contains the heat-resistant resin (a2) and does not contain a fluororesin, excellent adhesion between the substrate and the primer layer is achieved and a decrease in the hardness of the primer layer can be suppressed.

Since the primer layer contains the inorganic particles (a1) having an average particle size of 3 μm or greater, excellent adhesion between the primer layer and the intermediate layer adjacent to the primer layer is achieved and excellent adhesion between the intermediate layer and the top coat layer is also achieved.

As mentioned above, since the primer layer contains the inorganic particles (a1) and the heat-resistant resin (a2), the laminate of the present invention can achieve excellent adhesion.

The present invention will be more specifically described below referring to specific examples.

The substrate constituting the laminate of the present invention may be formed of any material, and examples of the material include metals such as simple metals and alloys thereof (e.g., iron, aluminum, stainless steel, copper); and non-metallic inorganic materials such as enamel, glass, and ceramic. Examples of the alloys include stainless steel. The material of the substrate is preferably a metal, more preferably aluminum or stainless steel.

The substrate may be subjected to any surface treatment before the use, such as degreasing treatment or surface-roughening treatment, if necessary. The surface-roughening treatment may be performed by any method, and examples thereof include chemical etching with acid or alkali, anodizing (formation of anodic oxide coating), and sandblasting. In order to uniformly apply a primer composition (i) for forming the primer layer without cissing, and to improve the adhesion between the substrate and the primer layer, the surface treatment may be appropriately chosen in accordance with the types of the substrate and the primer composition (i), and it is preferably sandblasting, for example.

The substrate may be subjected to a degreasing treatment in which the substrate alone is heated at 380° C. so that impurities such as oil are pyrolized and removed before the use. Alternatively, an aluminum substrate which has been subjected to a surface-roughening treatment with an alumina abrasive after the surface treatment may be used.

The primer layer constituting the laminate of the present invention contains a heat-resistant resin (a2). The heat-resistant resin (a2) generally has only to be a resin that is recognized to have heat resistance. The "heat resistance" herein means a property of the material that is durable to continuous use at a temperature of 150° C. or higher. It should be noted that the heat-resistant resin (a2) does not contain the aforementioned fluororesin.

The heat-resistant resin (a2) may be any heat-resistant resin, and is preferably at least one selected from the group consisting of polyamide-imides (PAIS), polyimides (PIs), polyethersulfones (PESs), polyetherimide, polyether ether ketone, aromatic polyesters, and polyarylene sulfides, more preferably at least one selected from the group consisting of PAIS, PIs, and PESs.

The PAIS are resins each formed of a polymer having an amide bond and an imide bond in the molecular structure. The PAI may be any PAI, and examples thereof include resins formed of any high molecular weight polymer obtained by any of the following reactions: a reaction between an aromatic diamine having an amide bond in the molecule and an aromatic tetravalent carboxylic acid (e.g., pyromellitic acid); a reaction between an aromatic trivalent carboxylic acid (e.g., trimellitic anhydride) and a diamine (e.g., 4,4-diaminophenyl ether) or a diisocyanate (e.g., diphenylmethane diisocyanate); and a reaction between a dibasic acid having an aromatic imide ring in the molecule and a diamine. For excellent heat resistance, the PAI is preferably one formed of a polymer having an aromatic ring in the main chain.

The PIs are resins each formed of a polymer having an imide bond in the molecular structure. The PI may be any PI, and examples thereof include resins formed of any high molecular weight polymer obtained by a reaction of an aromatic tetravalent carboxylic anhydride such as pyromellitic anhydride. For excellent heat resistance, the PI is preferably one formed of a polymer having an aromatic ring in the main chain.

The PESs are resins each formed of a polymer having a repeating unit represented by the following formula.

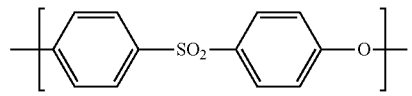

The PES may be any PES, and examples thereof include resins formed of any polymer obtained by polycondensation of dichlorodiphenyl sulfone and bisphenol.

In order to achieve excellent adhesion to the substrate, to achieve sufficient heat resistance even at a temperature in sintering performed in forming cooking utensils, and to achieve excellent corrosion resistance of the resulting cooking utensils, the heat-resistant resin (a2) is preferably at least one resin selected from the group consisting of PAIS, PIs, and PESs. PAIS, PIs, and PESs may be used alone or may be used in combination of two or more in each group.

For excellent adhesion to the substrate and heat resistance, the heat-resistant resin (a2) is more preferably at least one resin selected from the group consisting of PAIS and PIs.

For excellent corrosion resistance, the heat-resistant resin (a2) is preferably a mixture of a PES and at least one selected from the group consisting of PAIS and PIs. In other words, the heat-resistant resin (a2) may be a mixture of a PES and a PAI, a mixture of a PES and a PI, or a mixture of a PES, a PAI, and a PI. The heat-resistant resin is particularly preferably a mixture of a PES and a PAI.

When the heat-resistant resin (a2) is a mixture of a PES and at least one selected from the group consisting of PAIS and PIs, the amount of the PES is preferably 30 to 85 mass % of the sum of the amounts of the PES and the at least one resin selected from the group consisting of PAIS and PIs. The amount thereof is more preferably 40 to 80 mass %, still more preferably 45 to 75 mass %, particularly preferably 50 to 70 mass %.

The amount of the heat-resistant resin (a2) based on the whole volume of the primer layer is preferably 50 to 80 vol %. The amount thereof is more preferably 55 to 75 vol %, still more preferably 60 to 75 vol %. The heat-resistant resin (a2) used in an amount within the above range leads to improved adhesion between the substrate and the primer layer and improved adhesion between the primer layer and the intermediate layer.

The primer layer constituting the laminate of the present invention also contains inorganic particles (a1) having an average particle size of 3 μm or greater. The inorganic particles (a1) contained in the primer layer improve the abrasion resistance of the intermediate layer adjacent to the primer layer and the adhesion between the primer layer and the intermediate layer.

Examples of the inorganic particles (a1) include ceramic particles and metal particles. For good abrasion resistance, ceramic particles are preferred. The inorganic particles (a1) are more preferably particles of at least one selected from the group consisting of inorganic nitrides, carbides, borides, and oxides of zirconium, tantalum, titanium, tungsten, silicon, aluminum, or beryllium. For easy availability and cost reduction, silicon carbide or aluminum oxide is still more preferred.

In order to achieve an effect of improving the abrasion resistance of the intermediate layer adjacent to the primer layer, the inorganic particles (a1) preferably have a Knoop hardness of 1200 or higher, more preferably 2000 or higher. The Knoop hardness is a measure of the resistance of a material against a dent or scratch, and can be measured with a Terasawa-type micro-hardness tester (SM-2, Taiyo Tester Co., Ltd.), for example. Typical Knoop hardness values of preferred inorganic particles are as follows: zirconia (1200), aluminum nitride (1225), beryllia (1300), zirconium nitride (1510), zirconium boride (1560), titanium nitride (1770), tantalum carbide (1800), tungsten carbide (1880), aluminum oxide (2025), zirconium carbide (2150), titanium carbide (2470), silicon carbide (2500), aluminum boride (2500), and titanium boride (2850).

The inorganic particles (a1) may be in the form of particles or flakes, for example, and they are preferably in the form of particles, particularly preferably in the form of crushed particles.

The inorganic particles (a1) have an average particle size of 3 μm or greater. The average particle size of the inorganic particles (a1) is preferably 6 μm or greater, more preferably 8 μm or greater. The average particle size of the inorganic particles (a1) is preferably 14 μm or smaller, more preferably 13 μm or smaller. The inorganic particles (a1) having an average particle size within the above range can form a rough interface between the primer layer and the intermediate layer, so that falling of the particles from the primer layer can be suppressed. Thereby, the interlayer bond strength is improved. Further, excellent adhesion between the intermediate layer and the top coat layer can also be achieved. This presumably results from an increase in the adhesive force due to the anchor effect and an increase in the bonding area. In order to further improve the adhesion between the primer layer and the intermediate layer and to improve the abrasion resistance of the top coat layer to be mentioned later, the inorganic particles (a1) preferably protrude from the primer layer.

The average particle size of the inorganic particles (a1) is calculated from the particle size distribution determined using a laser diffraction/scattering particle size/particle size distribution analyzer (Microtrac MT3300II, Nikkiso Co., Ltd., medium: pure water, temperature: room temperature).

The amount of the inorganic particles (a1) based on the whole volume of the primer layer is preferably 10 to 50 vol %, more preferably 20 to 40 vol %, particularly preferably 25 to 40 vol %. The inorganic particles (a1) used in an amount within the above range make it possible to maintain the adhesion between the substrate and the primer layer and to improve the adhesion between the primer layer and the intermediate layer and the abrasion resistance of the intermediate layer. Further, excellent adhesion between the intermediate layer and the top coat layer can be achieved. Too small an amount of the inorganic particles (a1) may fail to give a sufficient anchor effect on the surface of the primer layer. Although too large an amount of the inorganic particles (a1) may be expected to show an anchor effect, the particles may easily fall, so that the adhesion between the substrate and the primer layer may be deteriorated.

The primer layer is usually formed on the substrate. The primer layer may be prepared by, for example, applying a water paint containing the inorganic particles (a1) and the heat-resistant resin (a2) to the substrate and drying the paint. If necessary, the dried paint may be sintered.

The primer layer containing the inorganic particles (a1) and the heat-resistant resin (a2) is excellent in adhesion to the substrate because the heat-resistant resin (a2) essentially bonds to the inorganic particles and has adhesiveness to the substrate. The primer layer is also excellent in adhesion to the intermediate layer because the inorganic particles (a1) provide a rough interface between the primer layer and the intermediate layer. As mentioned above, the primer layer containing the inorganic particles (a1) and the heat-resistant resin (a2) has excellent adhesiveness to both the substrate and the intermediate layer.

The primer layer constituting the laminate of the present invention may further include any additive in addition to the inorganic particles (a1) and the heat-resistant resin (a2). Any additive may be used, and examples thereof include leveling agents, solid lubricants, precipitation inhibitors, moisture absorbents, surface conditioners, thixotropic agents, viscosity modifiers, anti-gelling agents, ultraviolet absorbers, photostabilizers, plasticizers, anti-flooding agents, anti-skinning agents, scratch inhibitors, fungicides, antibiotics, antioxidants, antistatics, silane-coupling agents, carbon black, clay, talc, diamond, fluorinated diamond, tourmaline, jade, germanium, extender pigments, corundum, silica stone, chrysoberyl, topaz, beryl, garnet, quartz, garnet, zirconium oxide, zirconium carbide, scaly pigments, glass, various reinforcing materials, various fillers, conductive fillers, and metal powders of gold, silver, copper, platinum, or stainless steel.

The amount of the additive(s) in the primer layer is preferably 0.1 to 5.0 mass %, more preferably 0.5 to 3.0 mass %, in the later-mentioned primer composition (i) containing the inorganic particles (a1) and the heat-resistant resin (a2).

The primer layer preferably has a thickness of 5 to 40 μm, more preferably 10 to 35 μm. Too thin a primer layer may not be expected to show an anchor effect on the primer surface, and may easily cause pinholes, so that the corrosion resistance of the laminate may be poor. Too thick a primer layer may easily suffer film defects such as cracks or scabs, so that the abrasion resistance, hardness, and corrosion resistance of the laminate may be poor. The upper limit of the thickness of the primer layer is still more preferably 30 µm, particularly preferably 25 µm.

The primer layer preferably has a maximum height roughness (Rz) of 10 µm or higher. The primer layer having a maximum height roughness (Rz) within the above range can have improved abrasion resistance. Further, excellent adhesion can be achieved between the intermediate layer and the top coat layer. The maximum height roughness (Rz) of the primer layer is more preferably 12 µm or higher, still more preferably 15 µm or higher, whereas it is preferably 20 µm or lower, more preferably 17 µm or lower.

The laminate of the present invention may include one primer layer or may include two or more primer layers.

The intermediate layer constituting the laminate of the present invention contains a fluororesin (b1). Thereby, the adhesion between the intermediate layer and the top coat layer can be improved.

The fluororesin (b1) to be used can be a polymer in which all the hydrogen atoms bonded to the carbon atoms are replaced by fluorine atoms. The fluororesin (b1) may be non-melt-fabricable or may be melt-fabricable.

The fluororesin (b1) is preferably one obtained by polymerizing an unsaturated monomer which has a vinyl group and in which all the hydrogen atoms are replaced by fluorine atoms in the molecule. The fluororesin (b1) may be a homopolymer of the unsaturated fluoromonomer, or may be a copolymer of two or more of the unsaturated fluoromonomers. The fluororesin (b1) may include one fluororesin alone, or may include two or more fluororesins in admixture.

Examples of the homopolymer of the unsaturated fluoromonomer and the copolymer of two or more of the unsaturated fluoromonomers include polytetrafluoroethylene (PTFE) (homopolymer of tetrafluoroethylene (TFE) (TFE homopolymer) and/or modified polytetrafluoroethylene (modified PTFE)), TFE/perfluoro(alkyl vinyl ether) (PAVE) copolymers (PFA), and TFE/hexafluoropropylene (HFP) copolymers (FEP). The TFE homopolymer and the modified PTFE are non-melt-fabricable. The fluororesin (b1) preferably includes PTFE, and also preferably includes PFA and/or FEP as well as PTFE.

The "modified PTFE" herein means one obtained by copolymerizing TFE with a small amount of a comonomer that does not give melt-fabricability to the resulting copolymer. The small-amount comonomer may be any comonomer, and examples thereof include HFP, chlorotrifluoroethylene (CTFE), and PAVE. The proportion of the small-amount comonomer added to the modified PTFE depends on the type thereof. In the case of PAVE, for example, the proportion of the PAVE is usually preferably 0.001 to 1 mass % of the sum of the amounts of the TFE and the small-amount comonomer.

The melt viscosity is determined as follows: the fluororesin is extruded through an orifice having a size of 2.1 mm in diameter×8 mm in length using a flow tester CFT-500C (Shimadzu Corp.) at a temperature 50° C. higher than the melting point and a load of 7 kgf, and the melt viscosity is calculated based on the extrusion rate at this time.

The melt-fabricable fluororesin preferably has a number average molecular weight of $2\times10^4$ to $1\times10^7$, particularly preferably $2\times10^5$ to $8\times10^6$. If the number average molecular weight is less than $2\times10^4$, the resulting film tends to be brittle. If the number average molecular weight exceeds $1\times10^7$, the melt viscosity tends to be too high so that the particles tend to be less likely to fuse with each other.

The number average molecular weight of the non-melt-fabricable fluororesin can be determined by the method disclosed in "Journal of Applied Polymer Science", vol. 17, pp. 3253-3257 (1973). The number average molecular weight of the FEP can be determined in accordance with the method disclosed in ASTM D2116 by measuring the melt flow rate (MFR), determining the melt viscosity (MV) by the following formula (1), and then determining the number average molecular weight (Mn) by the following formula (2).

Formula (1):

$$MV = \frac{\pi \times \text{pressure (kgf} \cdot \text{mm}^2) \times \text{orifice diameter (mm)}}{8 \times MFR \times \text{orifice diameter (mm)}} \quad \text{Formula (1)}$$

$$Mn = \sqrt[3.4]{\frac{MV}{162 \times 10^{-13}}} \quad \text{Formula (2)}$$

The fluororesin particles can be particles (particles in perfluoro-type fluororesin aqueous dispersion) produced by polymerizing (e.g., emulsion polymerizing) a fluoromonomer without any other treatment, and the average particle size thereof is preferably 0.01 to 100 µm, particularly preferably 0.1 to 5 µm. Particles having an average particle size of smaller than 0.01 µm are difficult to form a film. Particles having an average particle size exceeding 100 µm tend to clog a gun nozzle used in application.

In the present invention, the fluororesin particles obtained by emulsion polymerization are preferably used in the form of an aqueous dispersion. For good stability and film formability, the fluororesin aqueous dispersion preferably has a fluororesin solids content of 20 to 80 mass %, particularly preferably 40 to 70 mass %. The solids content can be adjusted at a stage of preparing a fluororesin aqueous dispersion composition.

The amount of the fluororesin (b1) is preferably 60 to 90 mass % based on the whole mass of the intermediate layer. The amount thereof is more preferably 65 to 85 mass %, still more preferably 70 to 80 mass %. The fluororesin (b1) used in an amount within the above range can improve the adhesion between the intermediate layer and the later-mentioned top coat layer adjacent to the intermediate layer.

The intermediate layer constituting the laminate of the present invention also contains a heat-resistant resin (b2).

The heat-resistant resin (b2) may be any of the heat-resistant resins exemplified for the heat-resistant resin (a2), and is preferably at least one selected from the group consisting of PAIS, PIs, and PESs. For excellent corrosion resistance, the heat-resistant resin (b2) more preferably contains a PES and at least one selected from the group consisting of PAIS and PIs.

The amount of the heat-resistant resin (b2) is preferably 10 to 40 mass % based on the whole mass of the intermediate layer. The amount thereof is more preferably 15 to 35 mass %, still more preferably 20 to 30 mass %. The heat-resistant resin (b2) used in an amount within the above range can improve the adhesion between the intermediate layer and the primer layer and the adhesion between the intermediate layer and the top coat layer.

The intermediate layer is usually formed on the primer layer. The intermediate layer may be prepared by, for example, applying an intermediate composition (ii) containing the fluororesin (b1) and the heat-resistant resin (b2) to the primer layer, optionally drying the composition if necessary, and sintering the composition.

The intermediate layer containing the fluororesin (b1) and the heat-resistant resin (b2) is excellent in adhesion to the primer layer because the heat-resistant resin (b2) has affinity with the heat-resistant resin (b2) in the primer layer. The intermediate layer is also excellent in adhesion to the top coat layer because the fluororesin (b1) has affinity with the fluororesin (c1) in the top coat layer. As mentioned above, the intermediate layer containing the fluororesin (b1) and the heat-resistant resin (b2) has excellent adhesiveness to both the primer layer and the top coat layer.

The intermediate layer may further include any additive in addition to the fluororesin (b1) and the heat-resistant resin (b2) to the extent that the effects of the present invention are not deteriorated. Any additive may be used, including the additives exemplified for the primer layer. Still, the intermediate layer preferably does not contain the inorganic particles exemplified as the inorganic particles (a1) or the later-mentioned inorganic particles (c2).

The amount of the additive(s) in the intermediate layer is preferably 6 to 16 mass %, more preferably 8 to 14 mass %, in the later-mentioned intermediate composition (ii) containing the fluororesin (b1) and the heat-resistant resin (b2).

The intermediate layer preferably has a thickness of 15 to 30 μm, more preferably 18 to 25 μm.

The top coat layer constituting the laminate of the present invention includes a fluororesin (c1). Thereby, the laminate of the present invention can exert various properties such as non-adhesiveness, heat resistance, and smoothness.

The fluororesin (c1) may be any of the fluororesins exemplified for the fluororesin (b1). The fluororesin (c1) preferably includes polytetrafluoroethylene (PTFE) (TFE homopolymer and/or modified PTFE), and also preferably includes PFA and/or FEP as well as PTFE.

The amount of the fluororesin (c1) is preferably 70 to 100 mass % based on the whole mass of the top coat layer. The amount thereof is more preferably 75 to 100 mass %, still more preferably 80 to 100 mass %. The fluororesin (c1) used in an amount within the above range can improve the non-adhesiveness of the top coat layer and of the surface of the top coat layer.

The top coat layer constituting the laminate of the present invention preferably further contains inorganic particles (c2).

The inorganic particles (c2) may be any of the inorganic particles exemplified for the inorganic particles (a1), and are more preferably particles of at least one selected from the group consisting of inorganic nitrides, carbides, borides, and oxides of zirconium, tantalum, titanium, tungsten, silicon, aluminum, and beryllium. For easy availability, silicon carbide and aluminum oxide are still more preferred.

In order to improve the abrasion resistance of the top coat layer, the inorganic particles (c2) preferably have a Knoop hardness of 1200 or higher, more preferably 2000 or higher.

The inorganic particles (c2) may be in any form, and may be in the form of particles or of flakes, for example.

The inorganic particles (c2) preferably have an average particle size of 14 μm or greater. The average particle size of the inorganic particles (c2) is more preferably 16 μm or greater, still more preferably 20 μm or greater. The inorganic particles (c2) having an average particle size within the above range can improve the abrasion resistance of the top coat layer. In order to further improve the abrasion resistance of the top coat layer, the inorganic particles (c2) preferably protrude from the top coat layer.

The average particle size of the inorganic particles (c2) is calculated from the particle size distribution determined using a laser diffraction/scattering particle size/particle size distribution analyzer (Microtrac MT3300II, Nikkiso Co., Ltd., medium: pure water, temperature: room temperature).

The amount of the inorganic particles (c2) is controlled in accordance with the type, hardness, or other factors of the inorganic particles (c2). In general, the inorganic particles in an amount within the range of 2 to 10 mass % of the fluororesin (c1) can improve the abrasion resistance of the top coat layer.

The top coat layer constituting the laminate of the present invention may further contain any additive in addition to the fluororesin (c1) and the inorganic particles (c2). Any additive may be used, including the additives exemplified for the primer layer.

The amount of the additive(s) in the top coat layer is preferably 10 to 30 mass %, more preferably 15 to 20 mass %, in the later-mentioned top-coat composition (iii) containing the fluororesin (c1).

The top coat layer preferably has a thickness of 10 to 40 μm. Too thin a top coat layer may fail to give sufficient durability and corrosion resistance to the resulting non-adhesive laminate. Too thick a top coat layer may easily suffer film defects such as cracks and scabs.

The lower limit of the thickness of the top coat layer is more preferably 15 μm, still more preferably 18 μm. The upper limit thereof is more preferably 30 μm, still more preferably 25 μm.

The laminate of the present invention including the substrate, the primer layer, the intermediate layer, and the top coat layer stacked in the given order may have printed matters such as letters or figures on the upper surface of the top coat layer.

The laminate of the present invention can be produced by the following production method, for example.

Specifically, the laminate of the present invention can be produced by a method including: a step (1) of forming a primer-coated film by applying a primer composition (i) to a substrate; a step (2) of forming an intermediate-coated film (Ap) by applying an intermediate composition (ii) containing the fluororesin (b1) and the heat-resistant resin (b2) to the primer-coated film; a step (3) of forming a top-coated film (Bp) by applying a top-coat composition (iii) containing the fluororesin (c1) to the intermediate-coated film (Ap); and a step (4) of completing a laminate including the substrate, the primer layer, the intermediate layer, and the top coat layer by sintering a laminate of the coated films including the primer-coated film, intermediate-coated film (Ap), and top-coated film (Bp).

The step (1) is a step of forming a primer-coated film by applying a primer composition (i) to a substrate.

In the primer composition (i) in which a liquid medium thereof is mainly composed of an organic liquid, the heat-resistant resin (a2) and the inorganic particles (a1) are dispersed and/or dissolved in the liquid medium in the form of particles. The organic liquid may be any of solvents, including conventionally known organic solvents, and such solvents may be used alone or in combination of two or more.

In the primer composition (i), the dispersed particles of the heat-resistant resin (a2) are usually produced by the method disclosed in JP S56-90862 A or the method disclosed in JP S59-33361 A.

For excellent adhesion to the substrate, the primer composition (i) is preferably a liquid dispersion.

For the purpose of improving the coating workability and the properties of the resulting laminate such as abrasion resistance and corrosion resistance, the primer composition (i) may further include any of the aforementioned additives in addition to the inorganic particles (a1) and the heat-resistant resin (a2).

The primer composition (i) may be applied to the substrate by any method. For the primer composition (i) in the form of liquid, examples of the method include spray coating, roll coating, doctor blade coating, dip (immersion) coating, impregnation coating, spin-flow coating, and curtain-flow coating. Preferred is spray coating.

The application of the primer composition (i) in the step (1) may or may not be followed by drying before the step (2). Further, sintering may or may not be performed.

In the step (1), the drying is preferably performed at 100° C. to 150° C. for 5 to 60 minutes. The sintering, if performed, is preferably performed at 300° C. to 400° C. for 10 to 30 minutes.

The primer-coated film is formed by applying the primer composition (i) to the substrate and then optionally drying or sintering the composition. The primer-coated film is to serve as a primer layer in the resulting laminate.

In the case of forming two or more primer layers, the composition of the primer composition (i) is varied as appropriate and the step (1) is repeated.

The step (2) is a step of forming an intermediate-coated film (Ap) by applying an intermediate composition (ii) containing the fluororesin (b1) and the heat-resistant resin (b2) to the primer-coated film.

The intermediate composition (ii) may be applied to the primer-coated film by any method, and examples of the method include the same methods of applying the primer composition (i).

The application of the intermediate composition (ii) to the primer-coated film in the step (2) may be followed by drying or sintering. The drying or sintering in the step (2) is preferably performed under the same conditions as in the drying or sintering in the step (1).

In general, sintering is preferably not performed immediately after the intermediate composition (ii) is applied to the primer-coated film. This is because all the applied films are to be sintered in the sintering of the laminate of the applied films in the step (4) to be mentioned later.

The intermediate-coated film (Ap) is formed by applying the intermediate composition (ii) to the primer-coated film, and then optionally drying or sintering the composition. The intermediate-coated film (Ap) is to serve as an intermediate layer in the resulting laminate.

The step (3) is a step of forming a top-coated film (Bp) by applying a top-coat composition (iii) containing the fluororesin (c1) to the intermediate-coated film (Ap).

The top-coat composition (iii) in the step (3) may be a powdery coating material containing the fluororesin (c1) and the inorganic particles (c2), or may be a liquid coating material such as water paint. In order to uniformly apply a coating material to the target and to form a film having a smooth surface, the composition (iii) is preferably a liquid coating material. In order to easily form a thick film with a small number of applying operations and without a drying step, the composition (iii) is preferably a powdery coating material. The top-coat composition (iii) which is a liquid coating material is preferably in the form of dispersion of the fluororesin (c1) and the inorganic particles (c2) in a liquid medium.

The top-coat composition (iii) may be applied to the intermediate-coated film (Ap) by any method, and examples of the method include the same methods of applying the primer composition (i). For the top-coat composition (iii) which is a powdery coating material, electrostatic coating is preferred.

In the case of forming two or more top coat layers, the composition of the top-coat composition (iii) is varied as appropriate and the step (3) is repeated.

The step (4) is a step of forming a laminate including the substrate, the primer layer, the intermediate layer, and the top coat layer by sintering a laminate of the applied films including the primer-coated film, the intermediate-coated film (Ap), and the top-coated film (Bp).

The production method may include a step of printing letters, figures, or others after the step (1) of forming the primer-coated film or the step (2) of forming the applied film (Ap).

The printing may be achieved by any method, and examples of the method include pad-transfer printing. Any printing ink may be used in the printing, and examples thereof include a composition consisting of PES, a TFE homopolymer, and titanium oxide.

The laminate of the present invention may constitute a coated article. The laminate is excellent in corrosion resistance, and thus can suitably be used in all the fields requiring the corrosion resistance. The coated article may be any article, and can be used in applications utilizing the non-adhesiveness, heat resistance, smoothness, or other properties of a fluoropolymer. Examples of those utilizing the non-adhesiveness include cooking utensils such as frying pans, pressure cookers, pots, electric skillets, rice cookers, ovens, electric griddles, bread baking pans, knives, and gas cooktops; kitchen utensils such as electric kettles, ice cube trays, metallic molds, and range hoods; parts for the food industry such as mixing rolls, rolling mills, conveyor belts, and hoppers; industrial items such as rolls for office automation (OA) equipment, belts for OA equipment, separation claws for OA equipment, paper-manufacturing rolls, and film-manufacturing calendar rolls; metal molds and releasing tools such as molds for molding expanded polystyrene, casting molds, release plates for production of plywood and/or decorated plywood; and industrial containers (especially, for the semiconductor industry). Examples of those utilizing the smoothness include tools such as saws and files; household utensils such as irons, scissors, and knives; metal foil and electric wires; sliding bearings for food processing equipment, packaging machinery, and spinning and weaving machinery; sliding components for cameras, clocks, and watches; automobile components such as pipes, valves, and bearings; and snow shovels, spades, and chutes.

Such a coated article including the aforementioned laminate is also one aspect of the present invention.

Advantageous Effects of Invention

Since the laminate of the present invention has the aforementioned configuration, it is excellent in abrasion resistance, high in hardness, and excellent in adhesion between the substrate and the primer layer and in adhesion between the intermediate layer and the top coat layer. Such a laminate can be particularly suitably used for cooking utensils, kitchen utensils, and other articles.

EXAMPLES

The present invention will be specifically described below referring to, but not limited to, examples and comparative examples. The terms "%" and "part(s)" respectively mean mass % and part(s) by mass.

Production Example 1: Preparation of Polyethersulfone Resin Aqueous Dispersion First, 60 parts of polyethersulfone resin (PES) having a number average molecular weight of about 24000 and 60 parts of deionized water were stirred in a ceramic ball mill until the PES particles were completely pulverized. Next, 180 parts of N-methyl-2-pyrrolidone (hereinafter, referred to as NMP) was added thereto and the solid was pulverized. Thereby, a PES aqueous dispersion having a PES concentration of about 20% was obtained. The PES particles in the PES aqueous dispersion had an average particle size of 2 μm.

Production Example 2: Preparation of Polyamide-Imide Resin Aqueous Dispersion Polyamide-imide resin (PAI) varnish (solids content: 29%, including 71% NMP) was put into water and the solid matter was pulverized in a ball mill. Thereby, a PAI aqueous dispersion was obtained. The resulting PAI aqueous dispersion had a solids content of 20%, and the PAI in the PAI aqueous dispersion had an average particle size of 2 μm.

Production Example 3

First, 49.53 parts of the PES aqueous dispersion (20%) obtained in Production Example 1, 33.02 parts of the PAI aqueous dispersion (20%) obtained in Production Example 2, 15.09 parts of silicon carbide (Knoop hardness: 2500) having an average particle size of 12 μm, and 0.2% (based on the sum of the solids contents of the PES, PAI, and silicon carbide) of a polyether nonionic surfactant (polyoxyethylene tridecyl ether), serving as a dispersion stabilizer, were added to 1.72 parts of a carbon black mill base (solids content: 20%). Thereby, a primer composition P1 was obtained.

Production Example 4

A primer composition P2 was prepared in the same manner as in Production Example 3 except that silicon carbide (Knoop hardness: 2500) having an average particle size of 10 μm was used instead of the silicon carbide having an average particle size of 12 μm.

Production Example 5

A primer composition P3 was prepared in the same manner as in Production Example 3 except that silicon carbide (Knoop hardness: 2500) having an average particle size of 8 μm was used instead of the silicon carbide having an average particle size of 12 μm.

Production Example 6

A primer composition P4 was prepared in the same manner as in Production Example 3 except that alumina (Knoop hardness: 2025) having an average particle size of 0.4 μm was used instead of the silicon carbide having an average particle size of 12 μm.

Production Example 7

A primer composition P5 was prepared in the same manner as in Production Example 3 except that no silicon carbide was used.

Production Example 8

First, 45.00 parts of a tetrafluoroethylene homopolymer (TFE homopolymer) aqueous dispersion (average particle size: 0.3 μm; solids content: 62%; containing, as a dispersant, a polyether nonionic surfactant (polyoxyethylene tridecyl ether) in an amount of 6% based on the TFE homopolymer), 8.69 parts of a TFE/hexafluoropropylene copolymer (FEP) aqueous dispersion (average particle size 0.17 μm; solids content: 63%; containing, as a dispersant, a polyether nonionic surfactant (polyoxyethylene tridecyl ether) in an amount of 6% based on the TFE homopolymer), 21.03 parts of the PES aqueous dispersion (20%) obtained in Production Example 1, and 7.13 parts of the PAI aqueous dispersion (20%) obtained in Production Example 2 were added to 4.19 parts of a carbon black mill base (solids content: 20%). Then, methyl cellulose in an amount of 4.4% (based on the solids content of the TFE homopolymer) was added as a thickening agent, and 4.6% (based on the sum of the solids content of the TFE homopolymer and the solids content of the FEP) of a nonionic surfactant (polyoxyethylene nonyl phenyl ether) was added as a dispersion stabilizer. Thereby, an aqueous dispersion (intermediate composition M1) having a solids content of 39.8% was obtained.

Production Example 9

An intermediate composition M2 was prepared in the same manner as in Production Example 8 except that 5.29 parts of silicon carbide (Knoop hardness: 2500) having an average particle size of 15 μm was further added.

Production Example 10

An intermediate composition M3 was prepared in the same manner as in Production Example 8 except that 5.29 parts of silicon carbide (Knoop hardness: 2500) having an average particle size of 21 μm was further added.

Production Example 11

First, 65.65 parts of a tetrafluoroethylene homopolymer (TFE homopolymer) aqueous dispersion (average particle size: 0.3 μm; solids content: 62%; containing, as a dispersant, 6% (based on the TFE homopolymer) of a polyether nonionic surfactant (polyoxyethylene tridecyl ether)), 12.22 parts of a depolymerizable acrylic resin emulsion (butyl acrylate resin, average particle size: 0.3 μm; solids content: 40%), 1.04 parts of a polyoxyethylene tridecyl ether aqueous solution (20%), 0.84 parts of a sodium lauryl sulfate aqueous solution (25%), 0.78 parts of a thickening agent (50% ammonium oleate aqueous solution), 3.36 parts of glycerin, 2.22 parts of diethylene glycol monoethyl ether, 0.45 parts of Surfynol 104A, 1.35 parts of an antifoam (hydrocarbon solvent), 1.03 parts of carbon black mill base (20%), 0.88 parts of titanium-coated mica, and 6.77 parts of water were mixed. Thereby, a top-coat composition T1 was obtained.

Production Example 12

A top-coat composition T2 was prepared in the same manner as in Production Example 11 except that 2.20 parts of silicon carbide (Knoop hardness: 2500) having an average particle size of 21 μm was further added.

Production Example 13

A top-coat composition T3 was prepared in the same manner as in Production Example 11 except that 2.20 parts of silicon carbide (Knoop hardness: 2500) having an average particle size of 8 μm was further added.

Production Example 14

A top-coat composition T4 was prepared in the same manner as in Production Example 11 except that 4.00 parts of glass flakes having an average particle size of 32 μm were further added.

Examples 1 to 6

A surface of an aluminum plate (A-1050P) was degreased with acetone, and then roughened by sand-blasting so as to have a surface roughness Ra of 2.0 to 3.0 μm determined in conformity with JIS B0601-2001. Dusts on the surface were removed by air blowing. The primer composition P1 or P2 was spray-applied using a gravity-feed spray gun at a spraying pressure of 0.2 MPa so as to have a dry thickness of 10 to 12 μm. Then, the primer composition P1, P2, or P3 was again applied so as to have a dry thickness of 10 to 13 μm.

The resulting applied film on the aluminum plate was dried at 100° C. to 150° C. for 15 minutes, and then cooled down to room temperature. Next, the maximum height roughness (Rz) was determined using a surface texture and contour measuring instrument (Surfcom 470A, Tokyo Seimitsu Co., Ltd.) in conformity with JIS B0601-2001.

Next, the intermediate composition M1 was applied so as to have a thickness of 18 to 21 μm. The applied film was dried at 100° C. to 150° C. for 15 minutes, and then cooled down to room temperature.

Next, one of the top-coat compositions T1 to T4 was applied so as to have a thickness of 18 to 22 μm. The applied film was dried at 100° C. to 150° C. for 15 minutes and sintered at 380° C. for 20 minutes. Thereby, a laminate of the applied films having a whole thickness of 60 to 63 μm was obtained. Table 1 shows the structures of the respective laminates in the examples.

Comparative Examples 1 to 3

A surface of an aluminum plate (A-1050P) was degreased with acetone, and then roughened by sand-blasting so as to have a surface roughness Ra of 2.0 to 3.0 μm determined in conformity with JIS B0601-2001. Dusts on the surface were removed by air blowing. The primer composition P4 or P5 was spray-applied using a gravity-feed spray gun at a spraying pressure of 0.2 MPa so as to have a dry thickness of 14 to 20 μm.

The resulting applied film on the aluminum plate was dried at 100° C. to 150° C. for 15 minutes, and then cooled down to room temperature. Next, the maximum height roughness (Rz) was determined using a surface texture and contour measuring instrument (Surfcom 470A, Tokyo Seimitsu Co., Ltd.) in conformity with JIS B0601-2001.

Next, the intermediate composition M1, M2, or M3 was applied so as to have a thickness of 17 to 20 μm. The applied film was dried at 100° C. to 150° C. for 15 minutes, and then cooled down to room temperature.

Next, the top-coat composition T1 or T2 was applied so as to have a thickness of 17 to 19 μm. The applied film was dried at 100° C. to 150° C. for 15 minutes and sintered at 380° C. for 20 minutes. Thereby, a laminate of the applied films having a whole thickness of 49 to 59 μm was obtained. Table 2 shows the structures of the respective laminates in the comparative examples.

(Measurement of Thickness)

In the applications of the compositions to form the respective applied films of the laminate, the respective compositions were simultaneously applied to a dummy aluminum plate (A-1050P). The thicknesses of the respective applied films formed on the dummy aluminum plate were measured, and the resulting values were treated as the thicknesses of the respective layers. Table 1 and Table 2 show the results.

(Abrasion Resistance)

A pad for industrial use (trade name: Scotch-Brite 7447C, 3M Co., containing alumina having a particle size of 320) was cut into a size of 3 cm square. A 1-cc portion of a 5% neutral detergent was dropped thereon, and the pad was reciprocated on the laminate at a load of 4.5 kg. For every 1000 reciprocating motions, the pad was replaced. The abrasion resistance was evaluated by the number of reciprocating motions until the substrate was exposed. Table 1 and Table 2 show the results.

(Measurement of Hardness of Applied Film)

The hardness measurement was performed using a pencil hardness tester equipped with a 200° C. hot stage. The hardness at which the top coat layer and the intermediate layer were separated was defined as a top coat/intermediate interface separation hardness, and the hardness at which the applied films were broken and the substrate was thus exposed was defined as a substrate separation hardness. Table 1 and Table 2 show the results. The signs 9H, 8H, 7H, 3H, 3B, 2B, 4B, and 6B in the tables mean the hardnesses of the pencils.

TABLE 1

| Configuration of laminate | | | | | Example 1 | Example 2 | Example 3 | Example 4 | Example 5 | Example 6 |
|---|---|---|---|---|---|---|---|---|---|---|
| | Primer layer 1 | Type of primer composition | | | P1 | P1 | P1 | P2 | P2 | P1 |
| | | Film thickness (μm) | | | 12 | 10 | 12 | 12 | 12 | 10 |
| | | Composition | PES | Vol % | 42.9 | 42.9 | 42.9 | 42.9 | 42.9 | 42.9 |
| | | | PAI | Vol % | 28.0 | 28.0 | 28.0 | 28.0 | 28.0 | 28.0 |
| | | | Silicon carbide | Vol % | 27.9 | 27.9 | 27.9 | 27.9 | 27.9 | 27.9 |
| | | | Carbon black | Vol % | 1.1 | 1.1 | 1.1 | 1.1 | 1.1 | 1.1 |
| | Primer layer 2 | Type of primer composition | | | P2 | P2 | P2 | P3 | P3 | |
| | | Film thickness (μm) | | | 12 | 12 | 13 | 12 | 11 | |
| | | Composition | PES | Vol % | 42.9 | 42.9 | 42.9 | 42.9 | 42.9 | |
| | | | PAI | Vol % | 28.0 | 28.0 | 28.0 | 28.0 | 28.0 | |
| | | | Silicon carbide | Vol % | 27.9 | 27.9 | 27.9 | 27.9 | 27.9 | |
| | | | Carbon black | Vol % | 1.1 | 1.1 | 1.1 | 1.1 | 1.1 | |
| | Maximum height roughness | Rz (μm) | | | 15 | 16 | 17 | 17 | 15 | 16 |

TABLE 1-continued

|  |  |  |  | Example 1 | Example 2 | Example 3 | Example 4 | Example 5 | Example 6 |
|---|---|---|---|---|---|---|---|---|---|
|  | Intermediate layer | Type of Intermediate composition |  | M1 | M1 | M1 | M1 | M1 | M1 |
|  |  | Film thickness (μm) |  | 19 | 21 | 20 | 20 | 19 | 18 |
|  |  | Composition | TFE homopolymer Mass % | 61.4 | 61.4 | 61.4 | 61.4 | 61.4 | 61.4 |
|  |  |  | FEP Mass % | 12.0 | 12.0 | 12.0 | 12.0 | 12.0 | 12.0 |
|  |  |  | PES Mass % | 18.3 | 18.3 | 18.3 | 18.3 | 18.3 | 18.3 |
|  |  |  | PAI Mass % | 6.1 | 6.1 | 6.1 | 6.1 | 6.1 | 6.1 |
|  |  |  | Carbon black Mass % | 2.2 | 2.2 | 2.2 | 2.2 | 2.2 | 2.2 |
|  | Top coat layer | Type of top-coat composition |  | T1 | T2 | T3 | T2 | T4 | T2 |
|  |  | Film thickness (μm) |  | 20 | 19 | 18 | 19 | 18 | 22 |
|  |  | Composition | TFE homopolymer Mass % | 97.4 | 92.5 | 92.5 | 92.5 | 88.9 | 92.5 |
|  |  |  | Carbon black Mass % | 0.5 | 0.5 | 0.5 | 0.5 | 0.5 | 0.5 |
|  |  |  | Titanium-coated mica Mass % | 2.1 | 2.0 | 2.0 | 2.0 | 1.9 | 2.0 |
|  |  |  | Silicon carbide Mass % | 0 | 5.0 | 5.0 | 5.0 | 0 | 5.0 |
|  |  |  | Glass flakes Mass % | 0 | 0 | 0 | 0 | 8.7 | 0 |
|  |  | Whole thickness (μm) |  | 63 | 62 | 63 | 63 | 60 | 60 |
| Physical properties of film | Abrasion resistance (number of reciprocating motions) |  |  | 5,000 | 12,000 | 5,000 | 10,000 | 3,000 | 7,000 |
|  | Top coat/intermediate interface separation hardness (200° C.) |  |  | 3B | 2B | 2B | 2B | 2B | 2B |
|  | Substrate separation hardness (200° C.) |  |  | 9H or higher | 9H or higher | 9H or higher | 8H | 9H or higher | 7H |

TABLE 2

|  |  |  |  |  | Comparative Example 1 | Comparative Example 2 | Comparative Example 3 |
|---|---|---|---|---|---|---|---|
| Configuration of laminate | Primer layer 1 | Type of primer composition |  |  | P4 | P4 | P5 |
|  |  | Film thickness (μm) |  |  | 14 | 15 | 20 |
|  |  | Composition | PES | Vol % | 15.5 | 15.5 | 59.6 |
|  |  |  | PAI | Vol % | 17.9 | 17.9 | 38.9 |
|  |  |  | Alumina | Vol % | 66.1 | 66.1 | 0 |
|  |  |  | Carbon black | Vol % | 0.5 | 0.5 | 1.6 |
|  | Maximum height roughness | Rz (μm) |  |  | 8 | 9 | 0.8 |
|  | Intermediate layer | Type of intermediate composition |  |  | M2 | M3 | M1 |
|  |  | Film thickness (μm) |  |  | 17 | 18 | 20 |
|  |  | Composition | TFE homopolymer | Mass % | 41.3 | 41.3 | 61.4 |
|  |  |  | FEP | Mass % | 20.4 | 20.4 | 12.0 |
|  |  |  | PES | Mass % | 15.7 | 15.7 | 18.3 |
|  |  |  | PAI | Mass % | 5.3 | 5.3 | 6.1 |
|  |  |  | Silicon carbide | Mass % | 14.7 | 14.7 | 0 |
|  |  |  | Carbon black | Mass % | 2.5 | 2.5 | 2.2 |
|  | Top coat layer | Type of top-coat composition |  |  | T1 | T1 | T2 |
|  |  | Film thickness (μm) |  |  | 18 | 17 | 19 |
|  |  | Composition | TFE homopolymer | Mass % | 97.4 | 97.4 | 92.5 |
|  |  |  | Carbon black | Mass % | 0.5 | 0.5 | 0.5 |
|  |  |  | Titanium-coated mica | Mass % | 2.1 | 2.1 | 2.0 |
|  |  |  | Silicon carbide | Mass % | 0 | 0 | 5.0 |
|  |  | Whole thickness (μm) |  |  | 49 | 50 | 59 |
| Physical properties of film | Abrasion resistance (number of reciprocating motions) |  |  |  | 10,000 | 12,500 | 5,000 |
|  | Top coat/intermediate interface separation hardness (200° C.) |  |  |  | 4B | 4B | 6B or lower |
|  | Substrate separation hardness (200° C.) |  |  |  | 3H | 3H | 9H or higher |

Table 1 and Table 2 prove that the laminates of the applied films obtained in Examples 1 to 6 show good film performance; specifically, the abrasion resistance and the hardness are well balanced.

The invention claimed is:
1. A laminate comprising:
a substrate;
a primer layer disposed on the substrate, the primer layer containing inorganic particles (a1) having an average particle size of 3 μm or greater and a heat-resistant resin (a2), but not containing a fluororesin;
an intermediate layer disposed on the primer layer and containing a fluororesin (b1) and a heat-resistant resin (b2); and a top coat layer disposed on the intermediate layer and containing a fluororesin (c1), wherein the top coat layer contains inorganic particles (c2), wherein the inorganic particles (c2) have an average particle size of 14 μm or greater, wherein the inorganic particles (a1) and (c2) have a Knoop hardness of 1200 or higher, and are zirconia, aluminum nitride, beryllia, zirconium nitride, zirconium boride, titanium nitride, tantalum carbide, tungsten carbide, aluminum oxide, zirconium carbide, titanium carbide, silicon carbide, aluminum boride, or titanium boride, wherein the top coat layer has a thickness of 10 to 40 μm, wherein the amount of the heat-resistant resin (b2) is 10 to 40 mass % based on the whole mass of the intermediate layer, and wherein the intermediate layer is free from inorganic particles (a1) and the inorganic particles (c2).

2. The laminate according to claim 1,
wherein the heat-resistant resin (a2) is at least one selected from the group consisting of polyamide-imides, polyimides, and polyethersulfones.

3. The laminate according to claim 1,
wherein the fluororesin (c1) contains polytetrafluoroethylene.

4. The laminate according to claim 1,
wherein the primer layer is obtained by applying a water paint containing the inorganic particles (a1) and the heat-resistant resin (a2) to the substrate.

5. The laminate according to claim 1,
wherein the primer layer has a thickness of 10 to 30 μm.

6. The laminate according to claim 1,
wherein the intermediate layer is free from inorganic particles.

7. The laminate according to claim 1,
wherein the fluororesin (b1) contains polytetrafluoroethylene.

8. The laminate according to claim 1,
wherein the heat-resistant resin (b2) is at least one selected from the group consisting of polyamide-imides, polyimides, and polyethersulfones.

9. The laminate according to claim 1,
wherein the primer layer has a maximum height roughness (Rz) of 10 μm or higher.

* * * * *